United States Patent
Choudhry et al.

(10) Patent No.: US 12,177,110 B1
(45) Date of Patent: Dec. 24, 2024

(54) RESOURCE-BASED NETWORK TRAFFIC MANAGEMENT

(71) Applicant: Amazon Technologies, Inc., Seattle, WA (US)

(72) Inventors: Akshay Choudhry, Seattle, WA (US); Ethan Joseph Torretta, Edmonds, WA (US); Scott Douglas Morrison, Boulder City, NV (US); Mathew Lehwess, San Francisco, CA (US); Shakeel Ahmad, Kew (AU); Justin Davies, La Jolla, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/192,594

(22) Filed: Mar. 29, 2023

(51) Int. Cl.
*H04L 45/02* (2022.01)
*H04L 45/28* (2022.01)
*H04L 45/42* (2022.01)

(52) U.S. Cl.
CPC .............. *H04L 45/02* (2013.01); *H04L 45/28* (2013.01); *H04L 45/42* (2013.01)

(58) Field of Classification Search
CPC .......... H04L 45/02; H04L 45/28; H04L 45/42
See application file for complete search history.

(56) References Cited

U.S. PATENT DOCUMENTS

| | | | |
|---|---|---|---|
| 2015/0288541 A1* | 10/2015 | Fargano | H04L 12/4641 709/225 |
| 2017/0373990 A1* | 12/2017 | Jeuk | H04L 45/64 |
| 2020/0028758 A1* | 1/2020 | Tollet | H04L 45/586 |
| 2020/0213225 A1* | 7/2020 | Han | H04L 47/829 |
| 2020/0235990 A1* | 7/2020 | Janakiraman | H04L 41/0893 |
| 2022/0046084 A1* | 2/2022 | Nair | H04L 47/20 |
| 2022/0231905 A1* | 7/2022 | Dhatchinamoorthy | H04L 67/1048 |
| 2023/0336414 A1* | 10/2023 | Miriyala | H04L 45/42 |

* cited by examiner

*Primary Examiner* — Mohamed A. Wasel
*Assistant Examiner* — Jihad K Boustany
(74) *Attorney, Agent, or Firm* — Nicholson De Vos Webster & Elliott LLP

(57) ABSTRACT

Techniques for resource-based network traffic management are described. A service of a cloud provider network receives a traffic policy, the traffic policy identifying a path to a gateway to an external network, the path identifies at least one network function in the path by a resource identifier of the cloud provider network. Traffic policy association data is received, the traffic policy association data associating the traffic policy with one or more virtual networks hosted by the cloud provider network. A network configuration of the cloud provider network is updated to route network traffic from a first virtual network to the gateway to the external network through the network function.

20 Claims, 8 Drawing Sheets

RESOURCE-BASED NETWORK TRAFFIC MANAGEMENT

BACKGROUND

Cloud computing platforms often provide on-demand, managed computing resources to users. Such computing resources (e.g., compute and storage capacity) are often provisioned from large pools of capacity installed in data centers of a cloud computing provider. Users can request computing resources from the "cloud," and the cloud can provision compute resources to those users. Technologies such as virtual machines and containers are often used to allow users to securely share capacity of computer systems.

BRIEF DESCRIPTION OF DRAWINGS

Various examples in accordance with the present disclosure will be described with reference to the drawings, in which.

DETAILED DESCRIPTION

Figure 1:
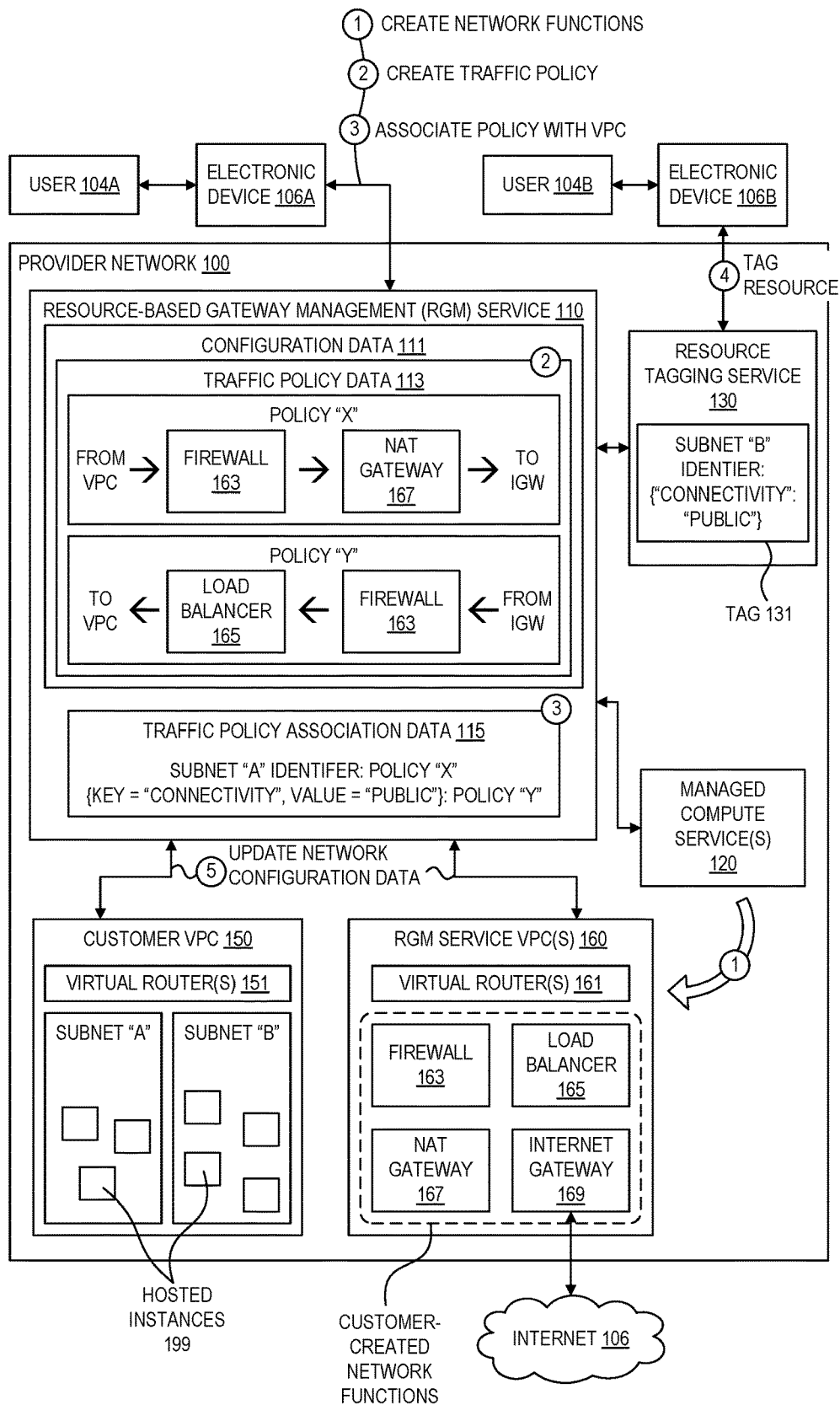
FIG. 1 illustrates a resource-based network traffic management service in a provider network environment according to some examples.

The present disclosure relates to enabling customers of a cloud computing environment to launch middlebox appliances directly in an internet gateway, rather than in their virtual private cloud (VPC). An internet gateway provides a target in VPC route tables for internet-routable traffic. For communication using IPv4, the internet gateway also performs network address translation (NAT). Middlebox appliances as used herein refers to software that performs networking or security functionality, such as inspecting traffic destined for a subnet. Example middlebox appliances include network firewall endpoints, NAT gateways, gateway load balancer endpoints (GWLBE) (a VPC endpoint that provides private connectivity between virtual appliances in the service provider VPC and application servers in the service consumer VPC), and global accelerators (which provides two or more global static public IPs that act as a fixed entry point to your application endpoints), to name a few. According to existing systems, customers launch such middlebox appliances in a specific VPC and the appliance occupies its own subnet, requiring customers to configure routing for each hop. Beneficially, according to the disclosed techniques, customers can create internet gateway profiles with specific networking and security appliances. Based on such profiles, the appliances can be launched in the internet gateway rather than in a specific VPC. Once launched in an internet gateway, middlebox appliances are accessible from any of the customer's VPCs. As a result, subnets in different VPCs can use the same resources.

The disclosed integration of internet-facing services with internet gateways provides a number of technical benefits. For example, this integration abstracts away the complexity of VPC networking away from development teams to a centralized networking administrator, abating chances of routing misconfigurations. Additionally, the disclosed integration enables more resilient services by allowing failover to healthy service interfaces. Another benefit is that security administrators in customer organizations can ensure consistent and appropriate border security posture across VPCs.

Accordingly, disclosed are methods, apparatus, systems, and non-transitory computer-readable storage media for resource-based network traffic management. According to some examples, a resource-based internet gateway management (RGM) service of a cloud provider network allows customers to create network traffic policies that define paths through various network functions between their cloud-hosted resources and external networks such as the internet. Such paths are specified at the network resource level, referring to various networking components such as firewalls, NAT gateways, access control list (ACL) filters, load balancers, etc. that can be implemented in software and/or hardware. The paths are specified as ordered sequences of network functions through which traffic passes for processing (e.g., applying firewall rules, performing address translations, etc.). In some examples, customers can define traffic policies for various traffic directions (e.g., ingress from an external network, egress to an external network, or bidirectional to cover routes having a common path for both ingress and egress traffic). Customers can then associate those traffic policies with their virtual private clouds (VPCs). Once associated to a network, the RGM service can translate the resource-level path descriptions into network-level configurations. The RGM service can then update the configuration of the network-level routing substrate to route traffic according to the policy-defined path(s).

Aspects of the RGM service and other functionality described herein provide several benefits over traditional network management approaches. Traditional network-level management paradigms often require in-depth knowledge of the existing network architecture and organization security policies. Such approaches often involved manually creating paths between individual network components—e.g., creating a route for traffic originating in one network to a first network component, then another route for that traffic to another network component, and so on. While IT or other administrative personnel of an organization may have the required expertise to properly configure their cloud-hosted networks, other users within an organization may not. As a result, IT personnel are often faced with a choice of erroring on the side of caution by restricting users from creating or connecting cloud resources without oversight, which can lead to an increased administrative burden, or having a permissive policy that is prone to misconfigurations. The RGM service can streamline the network configuration experience for users by reducing it from a configuring a sprawl of settings to the election of a traffic policy. Once a policy is associated with a VPC, the RGM service translates the resource-level path description into the associated network configuration and updates the associated components.

Even under a cautious approach, sophisticated personnel are at increased risk of making mistakes given the number of changes that must be made even for relatively simple traffic flows. Further complicating configuration efforts is providing for alternative paths in the event of network outages. By providing traffic policies that capture a user's intent with resource-level traffic paths, users can simply author a traffic policy with resource-level path descriptions, apply it to VPCs, and then rely on the RGM service to ensure that the underlying network components are properly configured in each case. The RGM service can also support traffic policies including failover paths that provide for an alternate route in the event there is an issue with the preferred or primary path.

Besides creating consistency, the policy-level traffic path specifications reduces the complexity of security audits by consolidating the traffic paths into a manageable number of policies as compared to the underlying networking configuration data. Users thus gain confidence in their border security posture (e.g., to external networks). In some examples, the RGM service can apply an organizational control policy, sometimes referred to as a service control policy, that provides an organization-wide security posture for traffic between a customer's VPCs and external networks by requiring one of the RGM service traffic policies to be applied to any VPC attempting to communicate with an external network.

Additionally, traditional networking approaches often relied on the user to instantiate the various networking components through which they would like to route traffic. In doing so, the user often gave up their own resources, typically in the form of allocating network addresses or address blocks (e.g., CIDR ranges) within their VPCs to the various networking components. By subsuming the management of those networking components, the RGM service reduces the need to allocate additional network addresses, which are often in short supply, particularly for large organizational customers.

The following is one example customer workflow enabled by the resource-level path descriptions supported by a RGM service as described herein. A customer can define an egress traffic policy with the RGM service indicating that traffic leaving a network destined for an external network address (e.g., on the internet) must pass through a firewall and then a NAT gateway before being routed to the external network via an internet gateway. The customer can then apply that traffic policy to a particular VPC hosted in the cloud provider network. The RGM service can then obtain the network addressing data of the firewall and the NAT gateway and update routing configuration(s) such that traffic directed toward an external network address routes from the particular VPC to the firewall, from the firewall to the NAT gateway, and from the NAT device to the internet gateway for transit to the external network.

The RGM service uses metadata to associate traffic policies with VPCs. The metadata association of VPCs (or their subnetworks) and traffic policies can be indirect and/or direct. In the latter case, the metadata specifies a relationship between a VPC identifier (or subnetwork identifier) and a traffic policy. Indirect associations can be created based on a matching of other metadata about a VPC (or subnetwork). This other metadata, often referred to as "tags," allows customers to annotate their cloud-hosted resources with descriptive information. The customer can then define associations between traffic policies and subnetworks based on the tags of a VPC. For example, a customer might tag one subnetwork of a particular VPC as "Environment=Development" and another subnetwork as "Environment=Production" where the tag is in the form of a key value pair (here, the key, "Environment" has different values for the two subnetworks). The customer can then define an association for a one traffic policy to apply to VPC subnetworks having the "Environment=Development" tag and another traffic policy to apply to virtual networks having the "Environment-Production" tag.

FIG. 1 illustrates a resource-based network traffic management service in a provider network environment according to some examples. As illustrated, a provider network 100 includes a resource-based internet gateway management (RGM) service 110. The RGM service 110 allows provider network customers to launch network components such as firewalls, NAT gateways, ACL filters, load balancers, anycast static address ingress endpoints, etc. and provide connectivity to customer-owned VPCs. Users can then configure traffic policies with the RGM service 110 that provide resource-level path descriptions (e.g., from component A to component B) between the customer-owned virtual networks and external networks accessible via an internet gateway. These policies can then be applied across multiple VPCs, providing a more manageable security posture across a user's cloud-hosted resources, reducing the overhead burden of configuring and managing such network components. Although the term "internet gateway" is used herein, more generally the gateway can be any gateway to an external network (e.g., a network outside of the control of the provider network). Such an internet gateway or gateway can itself be considered a network function and the end (or beginning) of a path.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") 104 of provider networks 100 can use one or more user accounts that are associated with a customer account, though these terms can be used somewhat interchangeably depending upon the context of use. Users 104 can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a mechanism for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM can be provided one or more IP addresses in the overlay network, and the VMM on a host can be aware of the IP addresses of the virtual machines on the host. The VMMs (and/or other devices or processes on the network substrate) can use encapsulation protocol technology to encapsulate and route network packets (e.g., client IP packets) over the network substrate between virtualized resources on different hosts within the cloud provider network. The encapsulation protocol technology can be used on the network substrate to route encapsulated packets between endpoints on the network substrate via overlay network paths or routes. The encapsulation protocol technology can be viewed as providing a virtual network topology overlaid on the network substrate. The encapsulation protocol technology can include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like. Provider network 100 includes manage compute service(s) 120, which can provide the underlying code execution or computing resources for the networking components and substrate underpinning the RGM service 110.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, the execution of compute instances is supported by a lightweight virtual machine manager (VMM). These VMMs enable the launch of lightweight micro-virtual machines (micro VMs) in non-virtualized environments in fractions of a second. These VMMs can also enable container runtimes and container orchestrators to manage containers as micro VMs. These micro VMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of micro VMs can be packed onto a single host. For example, a micro VM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Another type of managed compute service can be a container service, such as a container orchestration and management service (referred to in various implementations as a container service, cloud container service, container engine, or container cloud service) that allows users of the cloud provider network to instantiate and manage containers. In some examples the container service 114 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy.

Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

A virtual private cloud (VPC) (also referred to as a virtual network (VNet), virtual private network, or virtual cloud network, in various implementations) is a custom-defined, virtual network within another network, such as a cloud provider network. In this manner, a VPC can be considered one type of overlay network. A VPC can be defined by at least its address space, internal structure (e.g., the computing resources that comprise the VPC, security groups), and transit paths, and is logically isolated from other virtual networks in the cloud. A VPC can span all of the AZs in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each AZ or edge location associated with its region.

An exemplary workflow associated with the RGM service 110 is now described with reference to circled numbers "1" through "5." At circle (1) a user 104A (e.g., an IT administrator of a customer organization) uses their electronic device 106A (e.g., a computing device such as a laptop computer, personal computer, tablet, smart phone, or the like) to interact with the RGM service 110 to create the network functions (sometimes referred to as network components, network appliances, network devices, etc.) that will be used to specify resource-level paths.

As indicated above, a user can interact with services such as the RGM service 110 via a console implemented as a website or application, APIs, etc. Such a console may be a command-line based interface or graphical user interface. The example interactions included below illustrate exemplary command-line interface commands.

Upon receiving a request to create a networking function, the RGM service 110, the RGM service 110 can request the launch of the requested function via the manage compute service(s) 120. The managed compute service(s) 120 can then launch the requested resource from the associated container, machine image, etc. (e.g., a container containing a firewall application; a machine image of a load balancer or NAT gateway VM, etc.).

Initially, the user 104A can create an internet gateway that will serve as an egress point to/ingress point from devices on external networks, such as the internet 106. The user 104A can submit a "create-gateway" command to the RGM service 110. Once launched via a managed compute service 120, the RGM service 110 can return an internet gateway identifier to the electronic device 106A that the user 104A may reference in subsequent requests.

The user 104A can submit a "create-firewall" command to the RGM service 110. The command can include a parameter to indicate that the requested firewall function will be used in association with the internet gateway as part of creating traffic policies. Once launched via a managed compute service 120, the RGM service 110 can return a firewall identifier to the electronic device 106A that the user 104A may reference in creating traffic policies.

The user 104A can submit a "create-nat-gateway" command to the RGM service 110. The command can include a parameter to indicate that the requested NAT gateway function will be used in association with the internet gateway as part of creating traffic policies. Once launched via a managed compute service 120, the RGM service 110 can return a firewall identifier to the electronic device 106A that the user 104A may reference in creating traffic policies.

The user 104A can submit a "create-load-balancer" command to the RGM service 110. The command can include a parameter to indicate that the requested load balancer function will be used in association with the internet gateway as part of creating traffic policies. Once launched via a managed compute service 120, the RGM service 110 can return a load balancer identifier to the electronic device 106A that the user 104A may reference in creating traffic policies.

In some examples, the network function identifiers mentioned above are unique resource identifiers within the provider network 100. For example, a resource identifier "arn:aws:network-firewall:us-east-1:012345678901:firewall/myFirewallName" can uniquely identifier a particular firewall function within the provider network 100. Using such an identifier, a service such as the RGM service 110 can obtain metadata about the resource, including network addressing information such as a provider network substrate address, the VPC identifier, VPC address, etc. Such identifier metadata can be obtained from a control plane service (not shown).

Several more detailed example commands follow. In each example, a "connectivity-type" parameter is included via which the user 104A can indicate that the requested networking function will be used in association with an internet gateway as part of creating traffic policies. In some systems, a single internet gateway is permitted per user within the provider network or provider network partition (e.g., region, AZ, etc.). In such a case, the value "gateway" is sufficient to identify the previously-created, solitary gateway. If multiple internet gateways exist, the connectivity-type parameter can include a value that corresponds to a particular internet gateway identifier (e.g., received in response to the create-gateway command above). Additionally, each of the following commands relate to a provider network having AZ partitions, which may or may not be the case.

The following is an example command to create a firewall network function. The parameters include a name, policy identifier (e.g., that includes the firewall rules). This example request creates a firewall in two AZ partitions of a provider network. Creating a firewall in each AZ preserves AZ independence. In such a case, the RGM service 110 can return a firewall identifier for each of the firewalls (one created in a "us-west-2a" AZ and another created in a "us-west-2b" AZ).

create-firewall
    --firewall-name <value>
    --firewall-policy-id <value>
    --connectivity-type internet-gateway
    --availability-zones us-west-2a us-west-2b The following is an example command to create a NAT gateway. Again, this example assumes a provider networking having multiple AZs. An eip-allocation parameter provides, per-AZ, an identification of the network addresses to allocate to the NAT gateway to use in carrying out network address translation functions. As in the case of the firewall, the RGM service 110 can return a NAT gateway identifier for each AZ NAT gateway.

create-nat-gateway
   --connectivity-type internet-gateway
   --eip-allocation {availability-zone=us-west-2a,
     allocation-ids=eipalloc-09ad46b0dEXAMPLEa1
      eipalloc-09ad46b0dEXAMPLEa2,
     availability-zone=us-west-2b, allocation-ids=eipalloc-09ad46b0dEXAMPLEb1 eipalloc-09ad46b0dEXAMPLEb2 eipalloc-09ad46b0dEXAMPLEb2}

The following is an example command to create a load balancer endpoint for a load balanced service within a VPC. A "service-name" parameter identifies the load balanced service. Again, if multiple AZs are specified, the RGM service 110 can return a load balancer identifier for each AZ load balancer.

create-vpc-endpoint
   --vpc-endpoint-type GatewayLoadBalancer
   --service-name com.amazonaws.vpce.us-east-2.vpce-svc-12345678901234567
   --connectivity-type internet-gateway
   -availability-zones <value>

Resources launched within the provider network, such as the network functions described above, are typically launched within a VPC. In some examples, the network functions described above are launched into one or more managed RGM service managed VPCs 160. Various examples may launch the network functions into separate VPCs, different subnets of the same VPC, or the same subnet of a VPC. In any case, launching the network functions outside of a customer VPC, such as customer VPC 150, preserves network addresses in the customer VPC 150 by avoiding additional allocations or reservations for the network functions that were traditionally launched within the customer VPC.

In the illustrated example, a user has created an internet gateway 169 and associated a firewall 163, a load balancer 165, and NAT gateway 167.

Using the network functions with internet gateway connectivity, the user 104A can now create traffic policies that define paths through the functions. Such paths may also be referred to as "service chains" or "function chains." The paths can include an ordered sequence of one more more network functions (e.g., a single network function, a first and a last or final network function, a first network function, a second network function, and so on until a last network function, etc.).

At circle (2) the user 104A interacts with the RGM service 110 to create or submit traffic policies. An exemplary traffic policy includes an identification and order of network functions through which traffic should flow. The identification of the network functions can be performed at the resource level using resource identifiers, abstracting away the particulars of the networking configuration of the network functions. Traffic policies can be provided as a file, JSON object, etc., or as part of one or more messages or commands, such as the command shown in the following command-line examples.

The following is an example command to create an egress traffic policy such as policy X, where the network function identifiers are provided in order as values to the "traffic-path-from-subnet" parameter.

create-internet-gateway-traffic-policy
   --traffic-path-from-subnet <firewall-id> <nat-id>

The following is an example command to create an ingress traffic policy such as policy Y, again where the network function identifiers are provided in order as values to the "traffic-path-to-subnet" parameter.

create-internet-gateway-traffic-policy
   --traffic-path-to-subnet <firewall-id> <load_balancer-id>

In this manner, a user is able to define paths using resource-level identifiers (e.g., identifiers of the network functions) rather than network-level data (e.g., network addresses). The RGM service 110 can return identifiers of the created traffic policies. In some examples, users can also modify existing traffic policies with a "modify-internet-gateway-traffic-policy" command that includes as parameters an identification of the existing policy and the updated path.

Note that in above "from" example, the internet gateway is implicit as the end of the chain from the subnet as traffic would exit to the internet via the internet gateway (e.g., from the firewall to the NAT gateway to the internet gateway). In the "to" example, the internet gateway is implicit as the beginning of the service chain to the subnet as traffic would enter from the internet via the internet gateway (e.g., from the internet gateway to the firewall to the load balancer). In other examples, the internet gateway can be included explicitly. At the other end of the service chains (opposite the internet gateway), the to-be-assigned VPC remains implicit.

If multiple internet gateways exist, the above commands can further include an additional parameter through which to specify the identifier of a particular internet gateway.

In some examples, the RGM service 110 may support the definition of a bidirectional traffic path (as a shortcut to creating both "to" and "from" paths).

create-internet-gateway-traffic-policy
   --bidirectional-traffic-path <firewall-id> <nat-id> internet-gateway In the above example, the policy would provide for a service chain from the to-be-assigned VPC to the firewall to the NAT gateway to the internet and for a service chain from the internet gateway to the NAT gateway to the firewall to the to-be-assigned VPC.

The RGM service 110 can store traffic policies in traffic policy data 113 as part of configuration data 111. Two exemplary traffic policies are illustrated graphically: policy "X" and policy "Y." As shown, policy X includes an egress path from a VPC to the firewall 163, from the firewall 163 to the NAT gateway 167, and from the NAT gateway 167 to the internet gateway 169. Policy Y includes an ingress path from the internet gateway 169 to the firewall 163, from the firewall 163 to the load balancer 165, and from the load balancer 165 to a VPC. Paths may be specified including multiple network functions of the same type (e.g., firewall A to load balancer B to firewall C) or even the same network function multiple times (e.g., firewall A to load balancer B to firewall A).

At circle (3) the user 104A interacts with the RGM service 110 to create or submit traffic policy association data 115. Traffic policy association data 115 can be considered a form of metadata that associates or otherwise creates relationships between traffic policies and VPCs. The metadata association of VPCs (or their subnetworks) and traffic policies can be indirect and/or direct. In the latter case, the metadata specifies a relationship between a VPC identifier (or subnetwork identifier) and a traffic policy. In the illustrated example, the customer VPC 150 includes subnetworks "A" and "B." The cloud provider network 100 is host to several instances 199, indicated by the squares within these subnetworks. Traffic policy association data 115 includes an example direct association between an identifier of subnet A and traffic policy X. With this association, the cloud provider network (e.g., control plane network components, substrate level network components, etc.) can route traffic originating from instances 199 within subnet A and destined to external addresses via the internet gateway 169 first through the firewall 163 and then through the NAT gateway 167 before on route to their final destination via the internet gateway 169.

The following is an example command to create a direct association between a previously traffic policy and a VPC or VPC subnet. The command includes a "traffic-policy-id" parameter to specify the traffic policy identifier of a previously created policy (e.g., returned form the create-internet-gateway-traffic-policy command).

set-internet-gateway-traffic-policy
    --traffic-policy-id <value>
    [--vpc-ids <values>]
    [--subnet-ids <value>]

An indirect association is typically a rule establishing the applicability of traffic policies to VPCs based on VPC tags. Indirect associations can be created based on a matching of other metadata about a VPC (or subnetwork). Such other metadata about a resource is referred to as "tags." Briefly, tags allow users to annotate their cloud-hosted resources with descriptive information. For example, a user might tag one subnetwork of a particular VPC as "Environment=Development" and another subnetwork as "Environment=Production" where the tag is in the form of a key value pair (here, the key, "Environment" has different values for the two subnetworks). A resource tagging service 130 of the cloud provider network 100 can provide an interface through which users can set or modify tags and other systems or services can get tags.

A user can then create indirect traffic policy associations based on tag metadata. For example, one indirect association might indicate that one traffic policy applies to VPC subnetworks having an "Environment-Development" tag and another rule indicating that another traffic policy to apply to virtual networks having the "Environment=Production" tag.

The following is an example command to create indirect associations. The command includes a "traffic-policy-id" parameter to specify the traffic policy identifier of a previously created policy (e.g., returned form the create-internet-gateway-traffic-policy command) and a "vpc-tag" or "subnet-tag" parameter to indicate the particular tags that must be present in order to apply the traffic policy.

set-internet-gateway-traffic-policy
    --traffic-policy-id <value>
    [--vpc-tag={Key=<key>, Value=<value>}]
    [--subnet-tag={Key=<key>, Value=<value>}]

Traffic policy association data 115 includes an example indirect association between VPCs or subnetworks having a "Connectivity=Public" tag and traffic policy Y.

In some examples, indirect associations can be grouped together as a "persona" that applies different traffic policies across a VPC. The following is an example command to create a persona that applies different traffic policies based on VPC subnet tags. In this example, a persona is created having rules associating traffic policies with subnets in a us-east-1a AZ.

create-internet-gateway-routing-persona
    --set-traffic-policy {
        traffic-policy-id=igwtp-Example1aPublic,
        availability-zone=us-east-1a,
        subnet-tag={Key='connectivity', Value="public"},
        traffic-policy-id=igwtp-Example1aPrivate,
        availability-zone=us-east-1a,
        subnet-tag={Key='connectivity', Value="private"},
        traffic-policy-id=igwtp-Example1aDefault,
        availability-zone=us-east-1a,
        subnet-tag=default
}

In some examples, such as the above command, a "default" tag keyword can be used to default VPCs not matching any other indirect associations to a particular traffic policy. In this manner, the above command ensures that when the above persona is attached to a VPC, any subnet in us-east-1a with the "connectivity" set as "public" will follow traffic policy: igwrc-Example1aPublic, any subnet in us-east-1a with "connectivity" tag set as "private" will follow traffic policy: igwrc-Example1aPrivate, and any subnet in us-east-1a will, by default, follow the traffic policy: igwrc-Example1aDefault. That is, unless the subnets are tagged with Key="Connectivity" and Value="public" or "private," the subnets will always adhere to the default traffic policy.

In some examples, users can edit or otherwise modify existing personas. The following is an example to add a traffic policy and remove a traffic policy with the --add-traffic-policy setting and a --remove-traffic-policy options to the modify-internet-gateway-routing-persona-attributes command.

modify-internet-gateway-persona-attributes
    [--add-traffic-policy-setting \
        {
            traffic-policy-id =igwtp-Example1bPublic, availability-zone=us-east-1b, subnet-tag={Key='connectivity', Value="public"}
        }]\
    [--remove-traffic-policy-setting \
        {
            traffic-policy-id=igwtp-Example1aNatOnly, availability-zone=us-east-1a, subnet-tag={Key='connectivity', Value="NatOnly"}
    }]

In some examples, users can change the policy associations via tags by first removing and then adding a policy association for those tag(s).

Indirect associations or personas can be published to other users of a customer's organization, allowing other users to apply pre-defined traffic policies to their cloud hosted resources to meet their connectivity needs. In this example workflow, suppose another user 104B (e.g., someone outside of the customer organization's IT group) wanted to provide external access to instances 199 hosted within subnet B of the customer VPC 150. Assuming the user is unable to create new traffic policies or direct associations (e.g., due to limited permissions with the RGM service 110), the user can achieve their goal using the previously defined persona. At circle (4) the user 104A interacts with the resource tagging service 130 to tag subnet B of the customer VPC 150 with a "Connectivity=Public" tag.

The RGM service 110 can obtain the subnet B tag (either by polling the resource tagging service 130 or via the resource tagging service 130 publishing new VPC tags). The RGM service 110 can then evaluate the subnet B tag against the traffic policy association data 115. Based upon a match to the persona for policy Y, the RGM service 110 determines that policy Y applies. Then, as indicated at circle (5), the RGM service 110 updates the network configuration of one or more network-level components to permit traffic flows from the internet gateway 169, through the firewall 163 and then the load balancer 165, to subnet B pursuant to policy Y. As indicated, the customer VPC 150 and the RGM service VPCs 160 can each include one or more virtual routers 151 and 161, respectively. Additional details related to exemplary network-level configurations carried out by the RGM service 110 are described below with reference to FIG. 2.

In some examples, customers can define an organizational control policy or service control policy with the RGM service 110 to prohibit traffic between customer-owned VPCs and the internet gateway unless the RGM service 110 has applied one of the defined traffic policies 113 to the VPC. In such a case, the RGM service 110 can configure the internet gateway to drop any outbound traffic arriving at it from a VPC and/or to drop any inbound traffic arriving at it directed to the VPC that does not have an associated traffic policy.

Figure 2:
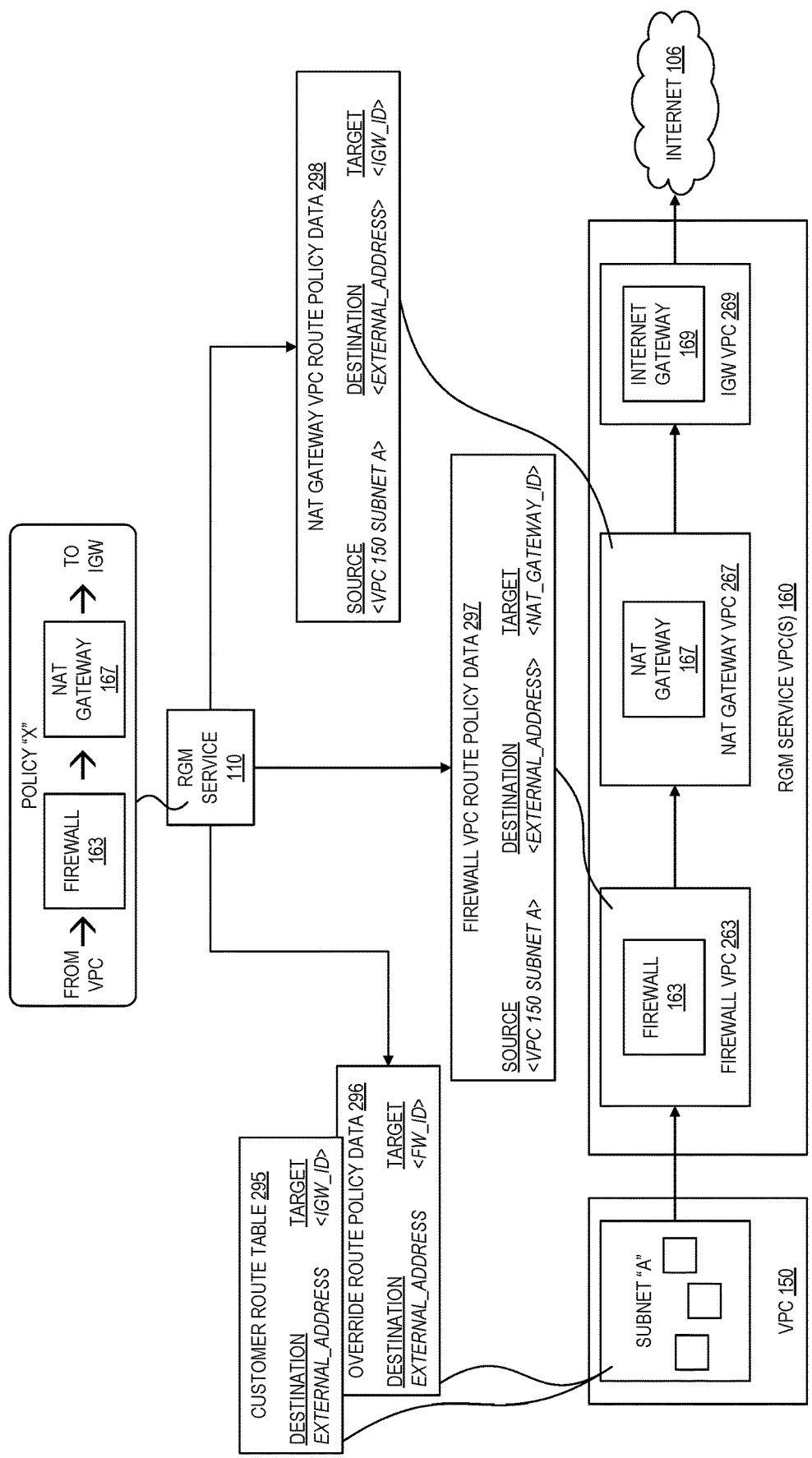
FIG. 2 illustrates a resource-based network traffic management service configuring network level components based on a resource-level network policy according to some examples.

FIG. 2 illustrates a resource-based network traffic management service configuring network level components based on a resource-level network policy according to some examples. In the illustrated example, the RGM service 110 is depicted as configuring network-level components to create the network-level path from the resource-level path of policy X as applied to subnet A of customer VPC 150. Customer VPC 150 (or subnet A thereof) has a customer-visible "route table" 295. In some examples, the RGM service 110 can modify the route table 295. In other examples, other routing data invisible to the customer can be modified. For example, a routing network function of the control plane can evaluate an override route policy 296 that is invisible to the customer but includes certain traffic engineering or other features to influence the behavior of traffic leaving the customer VPC. Route policies, such as route policy 296, typically exist at an intermediate control plane processing layer between VPCs and the substrate-level network route tables of the provider network. In this example, the routing network function would redirect traffic directed to an external network (via the IGW) to the first network function in the policy path pursuant to the override route policy 296.

The RGM service 110 updates the override route policy data 296 of subnet A to include an entry directing traffic destined to an external address (e.g., reachable via the internet gateway 169) to the firewall 163 network function. The RGM service 110 updates a route policy data 297 of a firewall VPC 263 to include an entry directing traffic originating from subnet A of VPC 150 and destined to an external address to the NAT gateway 167 network function. The RGM service 110 updates a route policy data 298 of a NAT gateway VPC 267 to include an entry directing traffic originating from subnet A of VPC 150 and destined to an external address to the internet gateway 169 network function. Each of the VPCs/subnets can include a virtual router that routes traffic according to the respective route policies.

In some examples, route policy targets can continue to be specified at the resource identifier level, such as illustrated (e.g., <FIREWALL_ID>, <NAT_GATEWAY_ID>, etc.). In such cases, a downstream entity, such as a virtual router, can convert the resource identifier to network-level configuration data (e.g., network addresses, VPC identifiers, etc.). In other examples, the RGM service 110 converts the resource-level identifiers used to define the traffic path to network-level configuration data in the form of network addresses. In such cases, the route table targets would include network address information rather than the resource identifiers.

Note that packet traversal through paths may not necessarily traverse traditional networks (e.g., from one computer system to another via an Ethernet cable, Wi-Fi, etc.). Instead, multiple network functions may be executing across one or more compute instances on the same host system. In such a case, a control plane component local to the host system can direct traffic exiting one instance (executing one network function) to another co-hosted instance (executing the next network function in the path).

In some examples, packet processors of the control plane executing on computer systems of the provider network can evaluate a policy and direct traffic accordingly. For example, packets leaving an instance in a VPC or VPC subnet having an associated traffic policy can be tagged with an identifier of the VPC or VPC subnet. The packet processors can identify the policy to be applied based on the VPC or VPC subnet identifier metadata and traffic policy association data. The packet processors can further add or modify additional metadata to indicate the stage of packet in traversing the service chain. For example, the additional metadata can include "to" metadata indicating the ordered list of network functions to be applied. The packet processor receiving a packet lacking the additional metadata can infer that the first network function in the policy chain is to be applied, add the "to" metadata identifying each function in the path, and direct the packet to the first network function in the path. Upon receipt of the packet from a network function, a packet processor can remove the identification of the network function from the head of the "to" metadata and direct the packet to the next network function in the "to" metadata, and so on.

Figure 3:
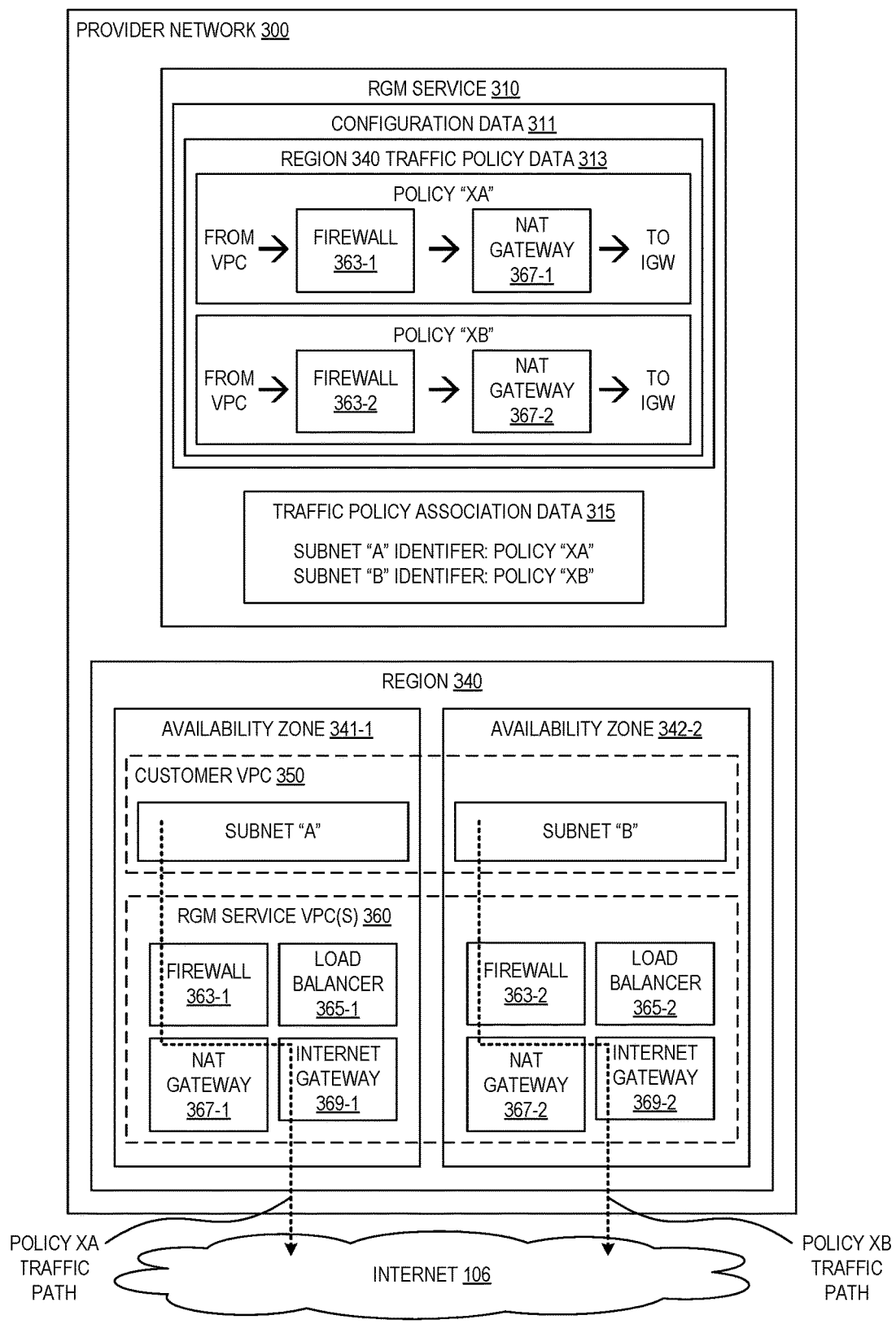
FIG. 3 illustrates a resource-based network traffic management service in another provider network environment according to some examples.

FIG. 3 illustrates a resource-based network traffic management service in another cloud provider network environment according to some examples. As illustrated, the provider network 300 includes a region 340 including two AZs 341-1 and 341-2. In some examples, a user can create redundant network functions across availability zones 341-1 and 342-2, such as indicated by firewalls 363-1 and 363-2, load balancers 365-1 and 365-2, NAT gateways 367-1 and 367-2, and internet gateways 369-1 and 369-2. A user can then define AZ-specific traffic policies XA and XB, as indicated in region 340 traffic policy data 313 of configuration data 311 of an RGM service 310. Configuration data 311 further includes traffic policy association data 315 creating a direct association between subnet A of a customer VPC 350 and policy XA and between subnet B of the customer VPC 350 and policy XB. As illustrated, policy XA creates a traffic path for subnet A through the network functions in AZ 341-1 and for subnet B through the network functions in AZ 341-2. Defining per-AZ traffic policies can preserve the increased availability provided by AZs.

Figure 4:
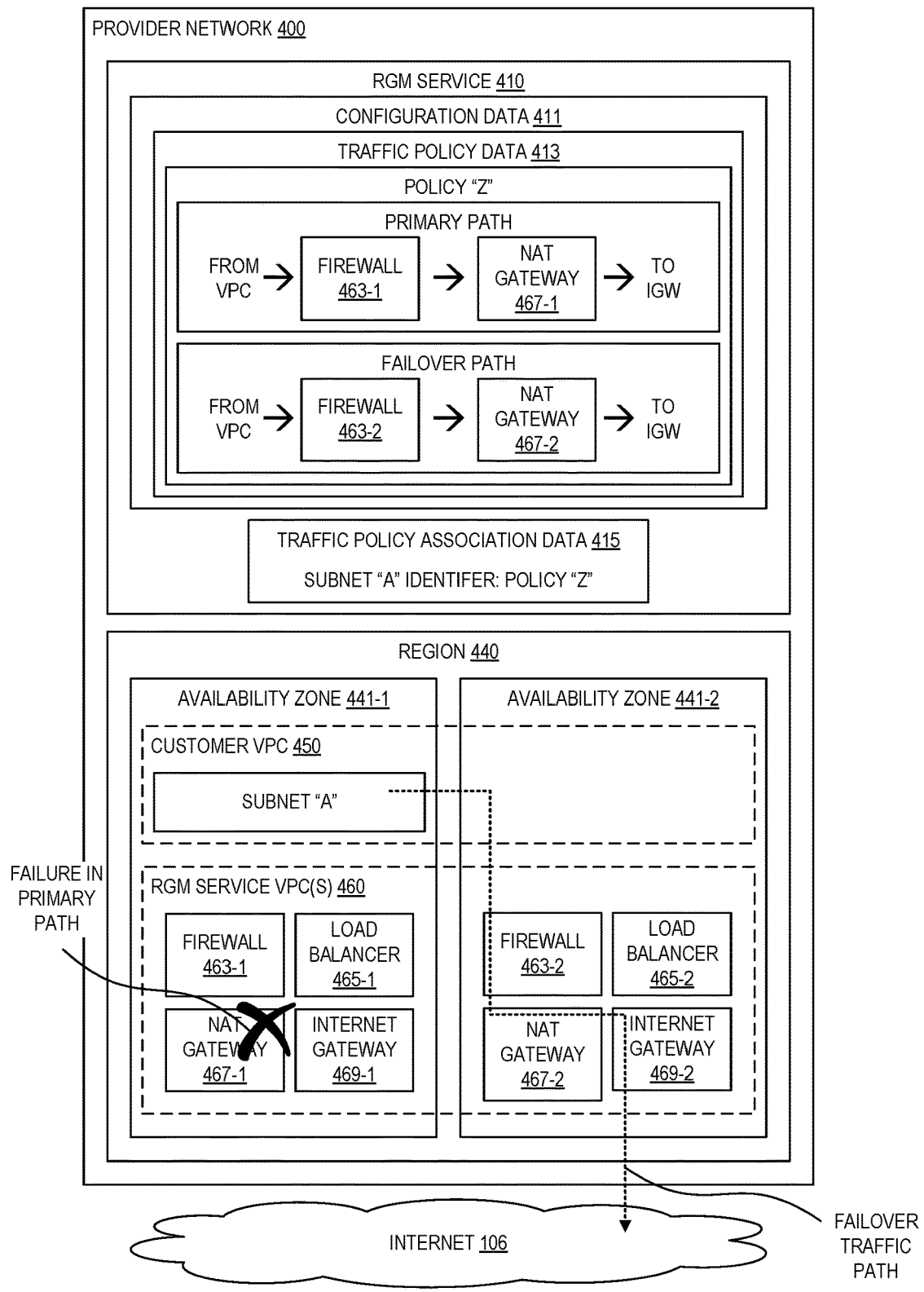
FIG. 4 illustrates a resource-based network traffic management service with a failover policy in a provider network environment according to some examples.

FIG. 4 illustrates a resource-based network traffic management service with a failover policy in a cloud provider network environment according to some examples. When an RGM service can be used to configure traffic paths across a provider network 400 having multiple regions and/or availability zones, the traffic policies can be used to define failover paths in some examples. As illustrated, the provider network 400 includes a region 440 including two AZs 441-1 and 441-2. A user can then define a traffic policy Z including a primary path and a failover path. As shown, policy Z includes a primary path from a VPC through the firewall 463-1 and the NAT gateway 467-1 to internet gateway associated with those network functions (e.g., 469-1). Policy Z further includes a failover path from the VPC through the firewall 463-2 and the NAT gateway 467-2 to internet gateway associated with those network functions (e.g., 469-2). In addition to the traffic policy data 413 containing policy Z, the configuration data 411 of an RGM service 410 includes traffic policy association data 415 creating a direct association between subnet A of a customer VPC 450 and policy Z. In the event of a failure of the primary or preferred path through the in-AZ network functions, the RGM service 410 can configure the provider network 400 to route traffic from subnet A via the failover path by, for example, adding a secondary route to the route table of subnet A to the firewall 463-2 (in addition to the primary route to the firewall 463-1). For example, if a network function (e.g., the routing function evaluating traffic leaving a VPC, a network function in a path) receives an error message, such as reported through TCP or IP level error handling, the network function can send a failure message to the RGM service 410. Upon receipt of such a failure message, the RGM service 410 can update the routing configuration such as described with reference to FIG. 2 to direct traffic via the failover path.

The following is an example command to create an egress traffic policy such as policy Z, where the network function identifiers are provided for the primary path in order as values to the "traffic-path-from-subnet" parameter and the network function identifiers are provided for the failover path in order as values to the "failover-resource-id" parameter. Note that the failover path does not need to mirror the primary path.

create-internet-gateway-traffic-policy
   --traffic-path-from-subnet <firewall-id> <nat-id>
   --failover-resource-id<failover-firewall-id>
     <failover-nat-id>

Figure 5:
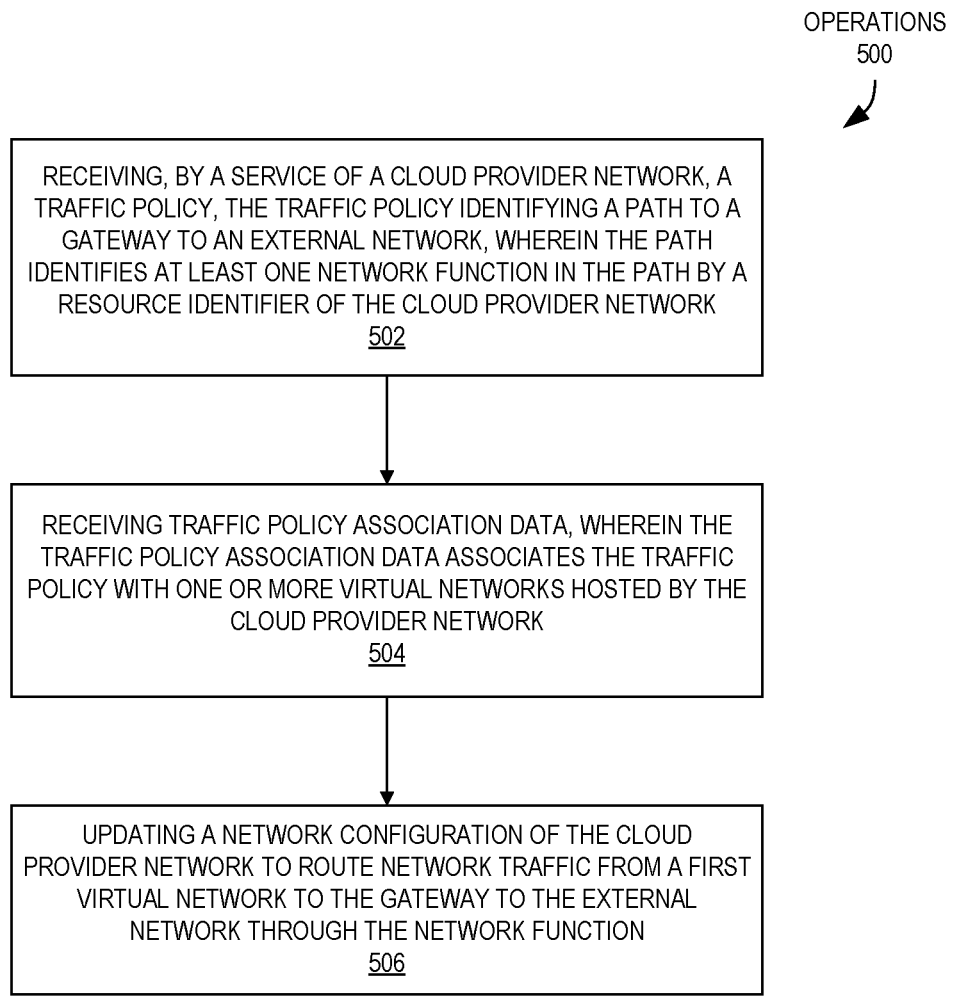
FIG. 5 is a flow diagram illustrating operations of a method for resource-based network traffic management according to some examples.

FIG. 5 is a flow diagram illustrating operations 500 of a method for resource-based network traffic management according to some examples. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by an RGM service such as RGM services 110, 310, 410 of the other figures.

The operations 500 include, at block 502, receiving, by a service of a cloud provider network, a traffic policy, the traffic policy identifying a path to a gateway to an external network, the path identifying at least one network function in the path by a resource identifier of the cloud provider network, such as depicted in and described with reference to FIG. 1. Exemplary network functions include firewalls, network address translation gateways, load balancers, and access control list filters. In some examples, the resource identifier of the cloud provider network uniquely identifies the at least one network function within the cloud provider network and is associated with a network address of the network function.

The operations 500 further include, at block 504, receiving traffic policy association data, wherein the traffic policy association data associates the traffic policy with one or more virtual networks hosted by the cloud provider network. In some examples, the traffic policy association data includes a rule indicating that if a virtual network is tagged with metadata having a particular value, the traffic policy applies to the virtual network. For example, the association of subnet "B" of customer VPC 150 with policy "Y" via tag 131.

In some examples, the service can obtain a metadata tag of the first virtual network and, prior to updating the network configuration, determine that a value of the obtained metadata tag matches the particular value of the rule.

The operations 500 further include, at block 506, updating a network configuration of the cloud provider network to route network traffic from a first virtual network to the gateway to the external network through the network function. In some examples, updating the network configuration includes updating at least one of a customer route table or override route policy data of the first virtual network, such as described with reference to FIG. 2.

In some examples, the network function is first in a sequence of network functions that form the path, the sequence including a last network function. In some examples, updating the network configuration can include updating route policy data of another virtual network associated with the service to direct traffic from a last network function in the sequence of network functions to the gateway to the external network.

In some examples, the traffic policy can identify a failover path to use if the path to the gateway to the external network is unavailable, such as depicted in and described with reference to FIG. 4.

Figure 6:
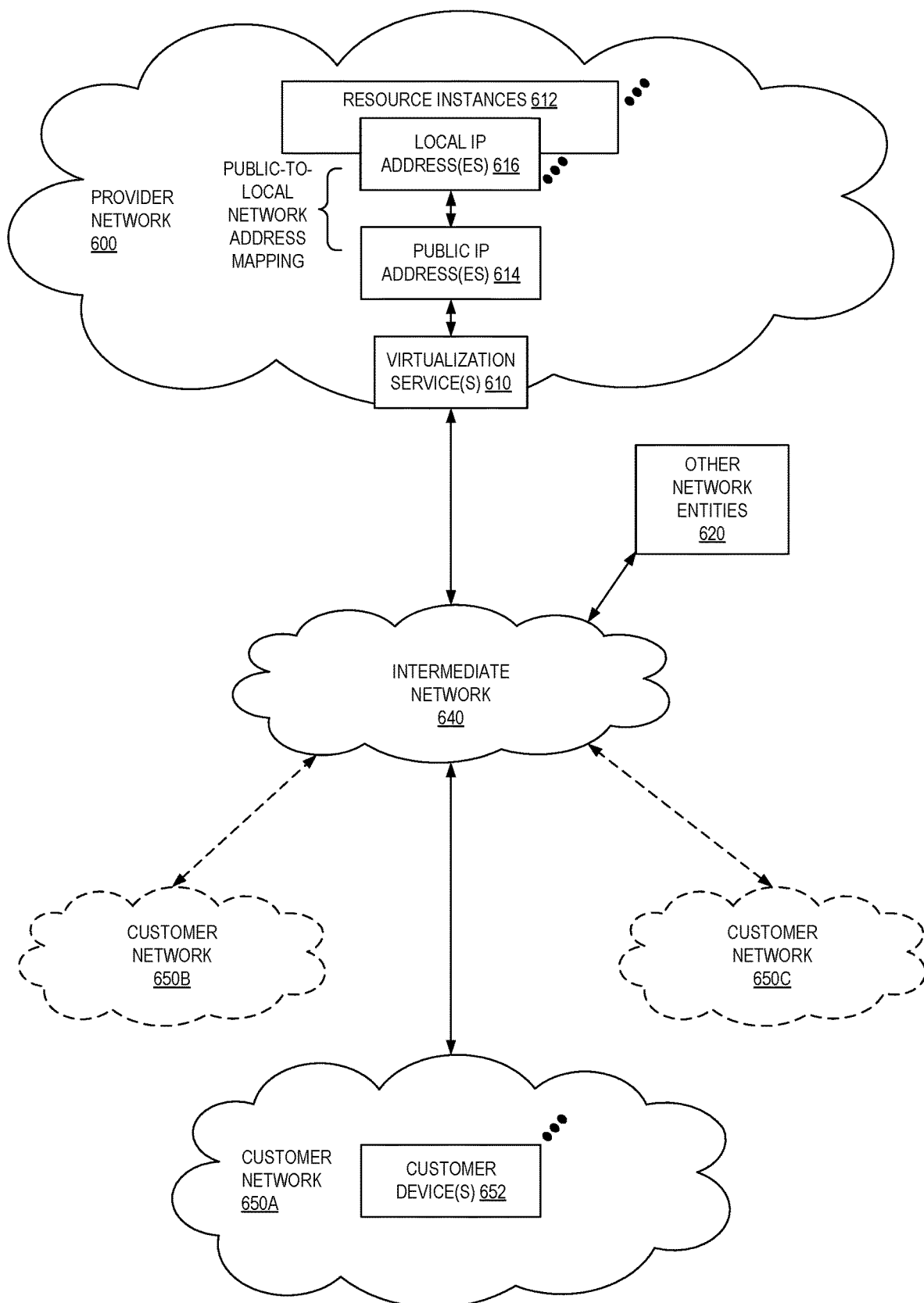
FIG. 6 illustrates an example provider network environment according to some examples.

FIG. 6 illustrates an example provider network (or "service provider system") environment according to some examples. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some examples, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
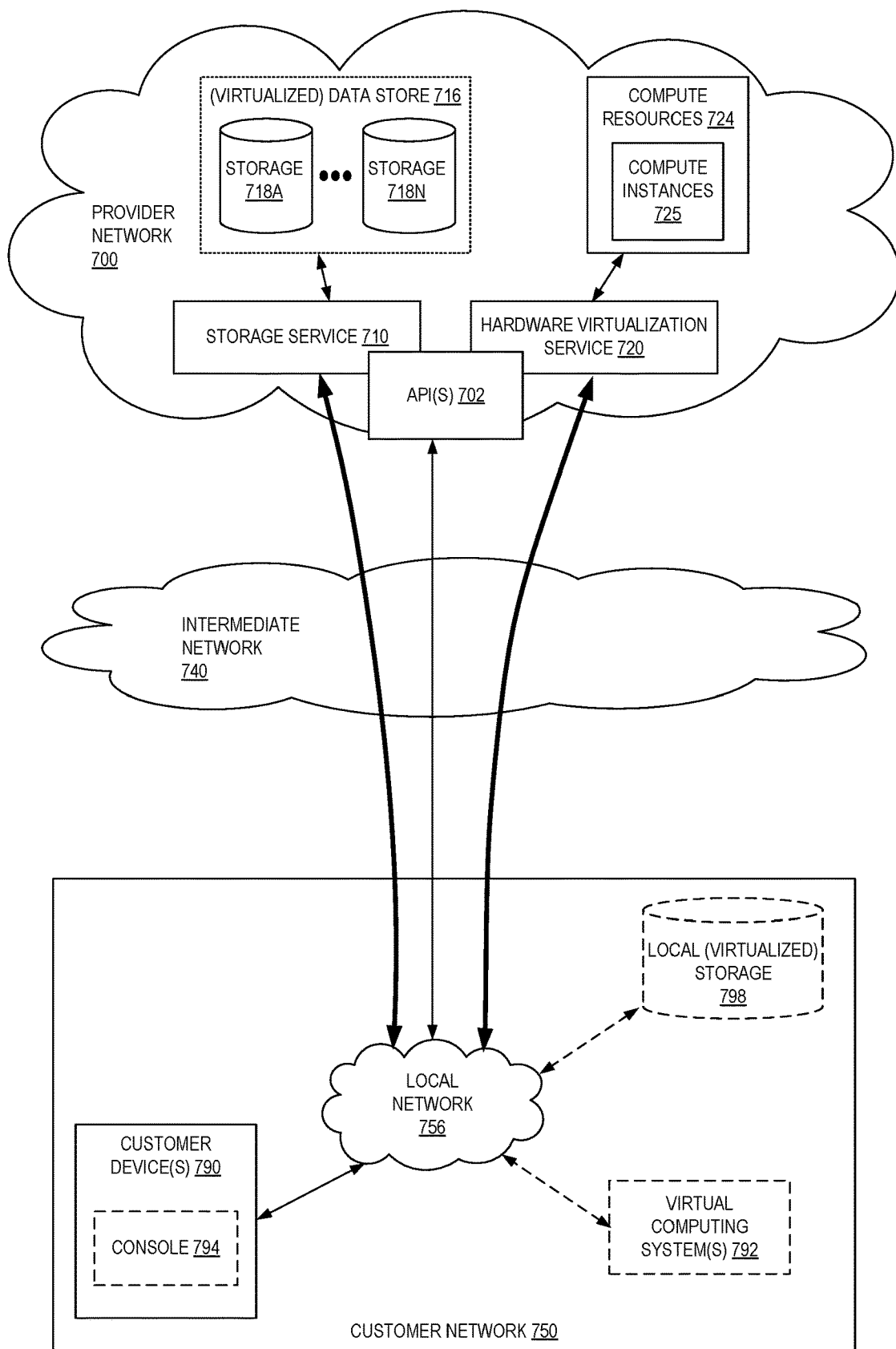
FIG. 7 is a block diagram of an example provider network that provides a storage service and a hardware virtualization service to customers according to some examples.

FIG. 7 is a block diagram of an example provider network environment that provides a storage service and a hardware virtualization service to customers, according to some examples. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some examples, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some examples, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some examples, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some examples, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Illustrative Systems

Figure 8:
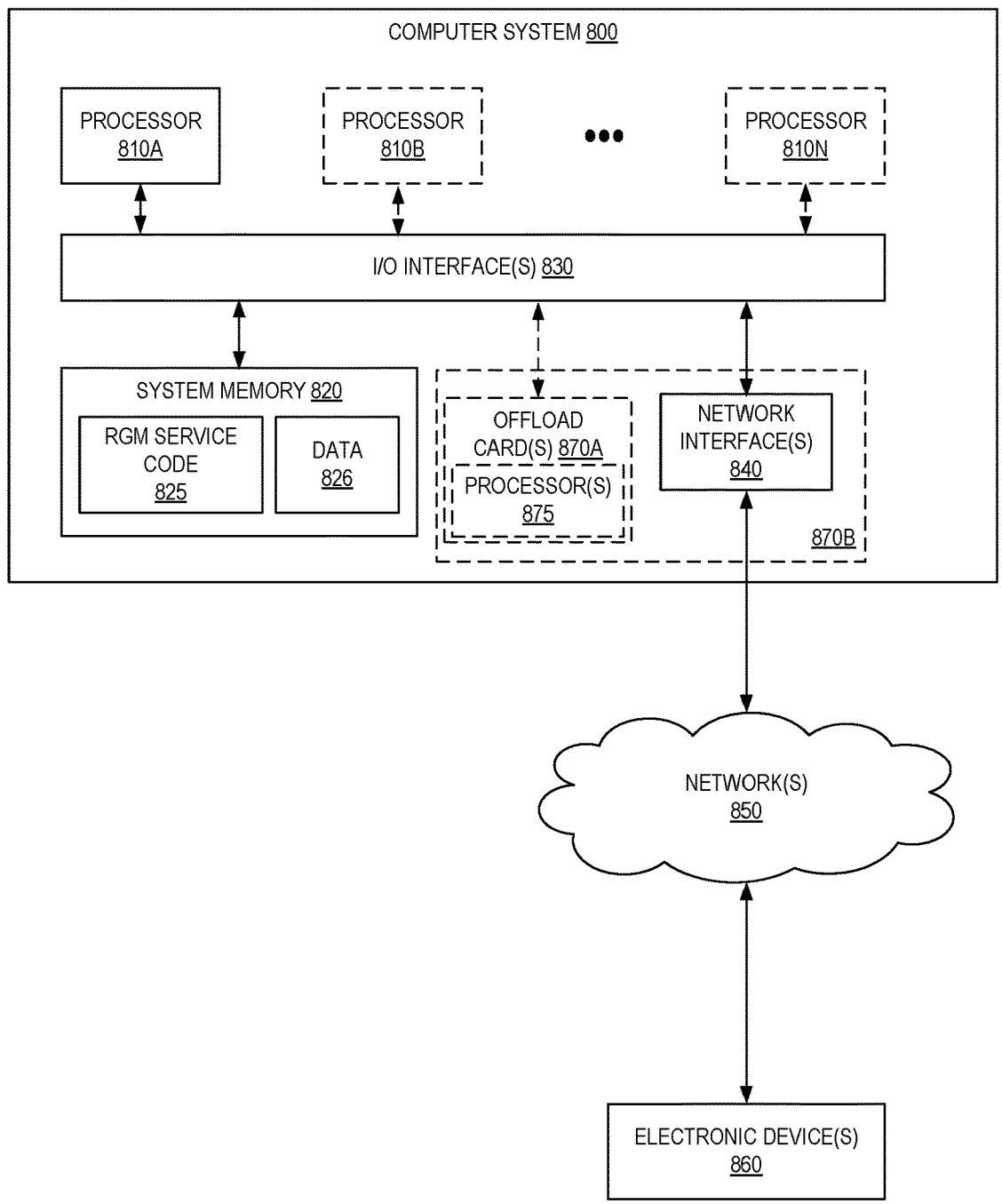
FIG. 8 is a block diagram illustrating an example computer system that can be used in some examples.

In some examples, a system that implements a portion or all of the techniques described herein can include a general-purpose computer system, such as the computer system 800 (also referred to as a computing device or electronic device) illustrated in FIG. 8, that includes, or is configured to access, one or more computer-accessible media. In the illustrated example, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various examples the computer system 800 can include one computing device or any number of computing devices configured to work together as a single computer system 800.

In various examples, the computer system 800 can be a uniprocessor system including one processor 810, or a multiprocessor system including several processors 810

(e.g., two, four, eight, or another suitable number). The processor(s) 810 can be any suitable processor(s) capable of executing instructions. For example, in various examples, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various examples, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 820 as RGM service code 825 (e.g., executable to implement, in whole or in part, the RGM service 110, 310, and/or 410) and data 826.

In some examples, the I/O interface 830 can be configured to coordinate I/O traffic between the processor 810, the system memory 820, and any peripheral devices in the device, including the network interface 840 and/or other peripheral interfaces (not shown). In some examples, the I/O interface 830 can perform any necessary protocol, timing, or other data transformations to convert data signals from one component (e.g., the system memory 820) into a format suitable for use by another component (e.g., the processor 810). In some examples, the I/O interface 830 can include support for devices attached through various types of peripheral buses, such as a variant of the Peripheral Component Interconnect (PCI) bus standard or the Universal Serial Bus (USB) standard, for example. In some examples, the function of the I/O interface 830 can be split into two or more separate components, such as a north bridge and a south bridge, for example. Also, in some examples, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various examples, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some examples the offload card(s) 870A or 870B can perform compute instance management operations, such as pausing and/or un-pausing compute instances, launching and/or terminating compute instances, performing memory transfer/copying operations, etc. These management operations can, in some examples, be performed by the offload card(s) 870A or 870B in coordination with a hypervisor (e.g., upon a request from a hypervisor) that is executed by the other processors 810A-810N of the computer system 800. However, in some examples the virtualization manager implemented by the offload card(s) 870A or 870B can accommodate requests from other entities (e.g., from compute instances themselves), and cannot coordinate with (or service) any separate hypervisor.

In some examples, the system memory 820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 718A-718N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving, by a gateway management service of a cloud provider network, a traffic policy, the traffic policy identifying a path to a gateway to an external network, wherein the path identifies at least one network function in the path by a resource identifier of the cloud provider network, and wherein the network function is at least one of a firewall, a network address translation gateway, a load balancer, or an access control list filter;
   receiving traffic policy association data, wherein the traffic policy association data includes a rule indicating that if a virtual network is tagged with metadata having a particular value, the traffic policy applies to the virtual network;
   obtaining a metadata tag of a first virtual network;
   determining that a value of the obtained metadata tag matches the particular value of the rule;
   updating a network configuration of the cloud provider network to route network traffic from the first virtual network to the gateway to the external network through the network function, wherein updating the network configuration of the cloud provider network includes obtaining a network address associated with the at least one network function based at least in part on the resource identifier; and
   routing network traffic from the first virtual network to the gateway to the external network through the network function.

2. The computer-implemented method of claim 1, wherein updating the network configuration includes updating at least one of a customer route table or override route policy data of the first virtual network.

3. The computer-implemented method of claim 1, wherein the at least one network function is first in a sequence of a plurality of network functions that form the path.

4. A computer-implemented method comprising:
   receiving, by a service of a cloud provider network, a traffic policy, the traffic policy identifying a path to a gateway to an external network, wherein the path identifies at least one network function in the path by a resource identifier of the cloud provider network;
   receiving traffic policy association data, wherein the traffic policy association data associates the traffic policy with one or more virtual networks hosted by the cloud provider network; and
   updating a network configuration of the cloud provider network to route network traffic from a first virtual network to the gateway to the external network through the network function, wherein updating the network configuration of the cloud provider network includes obtaining a network address associated with the at least one network function based at least in part on the resource identifier.

5. The computer-implemented method of claim 4, wherein the traffic policy association data includes a rule indicating that if a virtual network is tagged with metadata having a particular value, the traffic policy applies to the virtual network.

6. The computer-implemented method of claim 5, further comprising:
   obtaining a metadata tag of the first virtual network; and
   wherein updating the network configuration is conditioned at least in part on determining that a value of the obtained metadata tag matches the particular value of the rule.

7. The computer-implemented method of claim 4, wherein updating the network configuration includes updating at least one of a customer route table or override route policy data of the first virtual network.

8. The computer-implemented method of claim 7, wherein the at least one network function is first in a sequence of network functions that form the path.

9. The computer-implemented method of claim 8, wherein updating the network configuration further includes updating route policy data of another virtual network associated with the service to direct traffic from a last network function in the sequence of network functions to the gateway to the external network.

10. The computer-implemented method of claim 4, wherein the traffic policy identifies a failover path to use if the path to the gateway to the external network is unavailable.

11. The computer-implemented method of claim 4, wherein the network function is at least one of a firewall, a network address translation gateway, a load balancer, or an access control list filter.

12. The computer-implemented method of claim 4, wherein the resource identifier of the cloud provider network uniquely identifies the at least one network function within the cloud provider network and is associated with a network address of the network function.

13. A system comprising:
- a first one or more electronic devices to host a compute instance in a first virtual network of a multi-tenant provider network; and
- a second one or more electronic devices implementing a gateway management service in the multi-tenant provider network, the gateway management service including instructions that upon execution cause the gateway management service to:
  - receive a traffic policy, the traffic policy identifying a path to a gateway to an external network, wherein the path identifies at least one network function in the path by a resource identifier of the multi-tenant provider network;
  - receive traffic policy association data, the traffic policy association data associates the traffic policy with the first virtual network; and
  - update a network configuration of the multi-tenant provider network to route network traffic from the first virtual network to the gateway to the external network through the network function, wherein the instructions to cause the update include instructions to obtain a network address associated with the at least one network function based at least in part on the resource identifier.

14. The system of claim 13, wherein the traffic policy association data includes a rule indicating that if a virtual network is tagged with metadata having a particular value, the traffic policy applies to the virtual network.

15. The system of claim 14, the gateway management service including further instructions that upon execution cause the gateway management service to:
- obtain a metadata tag of the first virtual network; and
- wherein the instructions to update the network configuration are conditioned at least in part on a determination that a value of the obtained metadata tag matches the particular value of the rule.

16. The system of claim 13, wherein the instructions to update the network configuration include instructions to update at least one of a customer route table or override route policy data of the first virtual network.

17. The system of claim 16, wherein the at least one network function is first in a sequence of network functions that form the path.

18. The system of claim 17, wherein the instructions to update the network configuration include instructions to update route policy data of another virtual network associated with the gateway management service to direct traffic from a last network function in the sequence of network functions to the gateway to the external network.

19. The system of claim 13, wherein the traffic policy identifies a failover path to use if the path to the gateway to the external network is unavailable.

20. The system of claim 13, wherein the network function is at least one of a firewall, a network address translation gateway, a load balancer, or an access control list filter.

* * * * *